United States Patent [19]
Naito et al.

[11] Patent Number: 5,689,181
[45] Date of Patent: Nov. 18, 1997

[54] BRUSHLESS MOTOR SPEED DETECTING APPARATUS FOR REDUCING GENERATION OF SPIKE VOLTAGE

[75] Inventors: Hayato Naito; Nobuki Kokubo, both of Nagano, Japan

[73] Assignee: Kabushiki Kaisha Sankyo Seiki Seisakusho, Nagano, Japan

[21] Appl. No.: 584,271

[22] Filed: Jan. 11, 1996

[30] Foreign Application Priority Data

Jan. 13, 1995 [JP] Japan .................................... 7-020959
Nov. 16, 1995 [JP] Japan .................................... 7-322137

[51] Int. Cl.$^6$ .............................. H02P 6/02; G01P 3/46; G01P 3/42
[52] U.S. Cl. .............................. 324/177; 324/160
[58] Field of Search .............................. 324/173, 174, 324/177, 160, 163, 225, 207.12, 207.25

[56] References Cited

U.S. PATENT DOCUMENTS 4,847,555  7/1989  Stammer et al. ............... 324/173

FOREIGN PATENT DOCUMENTS 61-42288  2/1986  Japan .

*Primary Examiner*—Walter E. Snow
*Attorney, Agent, or Firm*—Sughrue,Mion,Zinn,Macpeak & Seas, PLLC

[57] ABSTRACT

A brushless motor speed detecting apparatus includes a stator having three-phase driving coils which are energized reciprocally in the positive and negative directions, a rotor having magnetic poles, three position detectors for obtaining three-phase output signals corresponding to the rotation of the rotor, a first synthesizing circuit for synthesizing the output signals of the three position detectors, mode switching circuit for forming an energizing mode switching signal according to the output signal of the first synthesizing circuit, a driving circuit for supplying currents to the driving coils by switching an energizing mode from a first energizing mode to a second energizing and vice versa according to the output signal of the mode switching circuit, and a second synthesizing circuit for synthesizing a speed signal by detecting in the non-energizing section of the first energizing mode the induced electromotive voltages generated in the driving coils as the rotor rotates to base the synthesis of the speed signal on the induced electromotive voltages.

14 Claims, 15 Drawing Sheets

HARD-SWITCHING CURRENT WAVEFORM

HARD-SWITCHING VOLTAGE WAVEFORM

SOFT-SWITCHING CURRENT WAVEFORM

SOFT-SWITCHING VOLTAGE WAVEFORM

HARD-SOFT MIX CURRENT SWITCHING WAVEFORM

HARD-SOFT MIX VOLTAGE SWITCHING WAVEFORM

8b; SWITCHING CIRCUIT
1; DRIVING CIRCUIT

BRUSHLESS MOTOR SPEED DETECTING APPARATUS FOR REDUCING GENERATION OF SPIKE VOLTAGE

BACKGROUND OF THE INVENTION

1. Field of the Invention

The present invention relates to a brushless motor speed detecting apparatus.

2. Related Art

FIG. 9 is a schematic block diagram of a brushless motor. The brushless motor comprises a stator X, a rotor Y, and three position detectors Hu, Hv, Hw. The stator X has three-phase driving coils Lu, Lv, Lw which are energized reciprocally in the positive and negative directions, whereas the rotor Y has a plurality of magnetic poles placed opposite to the driving coils. Moreover, the position detectors Hu, Hv, Hw are formed with, for example, three Hall elements disposed 120° out of phase with one another.

Heretofore, the so-called hard-switching energizing system and the so-called soft-switching energizing system have been known as a brushless motor driving system. Japanese Unexamined Patent Publication No. 42288/1986, for example, discloses these switching energizing system.

FIG. 19 shows a brushless motor driving circuit which employs the hard-switching energizing system (three-phase 120° switching energizing system).

In FIG. 19, Hall elements Hu, Hv, Hw as position detectors generate output signals (voltage waveforms) in a sine-wave like form shown in FIG. 2(g) in response to the rotation of a rotor Y facing three-phase driving coils Lu, Lv, Lw. The output signals are applied via amplifiers R, S, T to a signal synthesizing circuit SM as shown in FIG. 19. The signal synthesizing circuit SM is formed digitally with logic circuits and detects a zero-crossing point at which the output signals of the amplifiers R, S, T are reduced to zero so as to output three-phase 120° switching waveform signals (square wave pulses). Power transistors (a group of switching elements) Q31–Q36 constitute a final-stage driver and by means of the three-phase 120° switching waveform signals from the signal synthesizing circuit SM, supply the currents shown in FIG. 4(S) to the driving coils Lu, Lv, Lw, whereby the rotor Y rotates. The currents flowing through the driving coils Lu, Lv, Lw are detected by a current detecting resistor Rs, and the rotational speed of the rotor Y is detected by a speed detector. A control amplifier A41 takes out the difference between the output voltage (speed command voltage) of the speed detector and a reference voltage VREF as a current command voltage and a current feedback amplifier A42 outputs the difference between the current command voltage and the voltage of the current detecting resistor Rs. The output signal of the current feedback amplifier A42 is used to control the signal synthesizing circuit SM so that the output signal voltage is varied. In this case, filter capacitors Cu, Cv, Cw are used for reducing mechanical and electrical noises originating from sharp current variations when the energizing of the driving coils Lu, Lv, Lw is switched over.

In the hard-switching energizing system, the signal synthesizing circuit SM synthesizes the three-phase 120° switching waveform signals shown in FIG. 4(A) according to the output signals of the amplifiers R, S, T and applies the signals thus synthesized to the bases of the power transistors Q31–Q36, whereby each of the driving coils Lu, Lv, Lw is energized.

FIG. 20 shows a brushless motor driving circuit which employs the soft-switching energizing system (see Japanese Unexamined Patent Publication No. 42288/1986). In the brushless motor driving circuit employing the soft-switching energizing system, the three-phase output signals (voltage waveforms) in a sine-wave like form of FIG. 2(g) are output from the Hall elements Hu, Hv, Hw and applied via the amplifiers R, S, T to a signal synthesizing circuit SSM. The signal synthesizing circuit SSM makes use of the output signals of the amplifiers R, S, T 100% so as to synthesize three-phase 120° soft-switching waveform signals in an analog mode; namely, soft-switching signals in the form of a square wave pulse by logarithmically compressing the output signals of the amplifiers R, S, T to blunt the inflection point. The soft-switching signals are logarithmically compressed again by amplifier circuits A5, A6 including three-differential multipliers and applied via upper- and lower-stage pre-drivers PD1, PD2 to the bases of the power transistors (the group of switching elements) Q31–Q36, which supply the current shown in FIG. 4(C) to the driving coils Lu, Lv, Lw, whereby the rotor Y rotates. Incidentally, the filter capacitors Cu, Cv, Cw, the current detecting resistor Rs, the control amplifiers A41 and the current feedback amplifier A42 function similarly as described in FIG. 19. Further, the voltage at the mid-point of the driving coils Lu, Lv, Lw is detected by a coil mid-point detector and the voltage detected by the coil mid-point detector is compared with a reference voltage (½ of supply voltage VCC) by differential amplifiers A71, A72 and besides the output is multiplied by the output signal of the current feedback amplifier A42 in multipliers M1, M2. The output signals of the multipliers M1, M2 are then used to control the amplifiers circuit A5, A6 so that the output signals are varied. Thus the speed control of the rotor Y, coil-current feedback control and coil mid-point voltage feedback control are implemented.

In the soft-switching energizing system, the signal synthesizing circuit SSM synthesizes the soft-switching signal whose inflection point is blunted according to the output signals of the Hall elements Hu, Hv, Hw. The signal thus synthesized is logarithmically compressed again by the amplifier circuits A5, A6 into what has the waveform shown in FIG. 4(C) and used to energize the driving coil in each phase.

As is obvious from the current waveforms shown in FIGS. 4(A), (C), the speed of turning off the coils is high so that the energizing of them is instantly stopped in the hard-switching energizing system (see FIG. 4(A)), whereas the speed of turning off the coils is low so that the energizing quality is gradually decreased in the soft-switching energizing system (see FIG. 4(B)). In other words, since the zero-crossing point of each waveform exists in the non-energizing section (quiescent section) in FIG. 4, the non-energizing section in which the driving coils are not energized is relatively long in the hard-switching energizing system, whereas the non-energizing section therein is extremely short in the soft-switching energizing system.

The pure induced electromotive voltage generated in each of the three-phase driving coils Lu, Lv, Lw needs detecting in a brushless motor speed detecting apparatus so as to obtain a speed signal with accuracy and such a pure induced electromotive voltage is available in the non-energizing section of each of the driving coils Lu, Lv, Lw. Therefore, it is hardly possible to detect the pure induced electromotive voltage when use is made of the soft-switching system in which the non-energizing section is extremely short. Consequently, the hard-switching system is generally employed because on/off of coils appears obvious and because the non-energizing section of each of the driving coils Lu, Lv, Lw is long. Reference character P in this case represents induced electromotive voltage detecting timing.

Since the speed of turning off the coils is high in the hard-switching energizing system as described above, however, the so-called spike voltage which makes the coil voltage lower than the grounding voltage or higher than the supply voltage VCC is generated. The size of the spike voltage is proportional to the off-energizing speed and the size of the current flowing through the coils immediately before the coils are turned off. The problem is that the spike voltage has caused various nonconformities to arise from, for example, motor noise, and through current, current interruption and oscillation due to parasitic transistors of driving ICs.

Although it can be considered to reduce the spike voltage by providing an output snubber capacitor, the provision of such a snubber capacitor is undesirable because the accuracy of the speed signal is deteriorated.

In the soft-switching energizing system, moreover, the speed of turning off the coils is low as described above and as shown in FIG. 4(D), non-energizing section of the driving coils is extremely short though no spike voltage is generated; this makes it difficult to detect the pure electromotive voltage.

SUMMARY OF THE INVENTION

An object of the present invention is to provide a brushless motor speed detecting apparatus which is adapted to reduce the generation of a spike-like voltage and to make a speed signal available with accuracy by detecting a pure induced electromotive voltage.

A brushless motor speed detecting apparatus includes a stator having three-phase driving coils which are energized reciprocally in the positive and negative directions, a rotor having magnetic poles, three position detectors for obtaining three-phase signals corresponding to the rotation of the rotor, a first synthesizing circuit for synthesizing output signals from the three phase signals, mode switching means for forming an energizing mode switching signal according to the output signal of the first synthesizing circuit, a driving circuit for supplying currents to the driving coils and during supplying currents switching an energizing mode from a first energizing mode to a second energizing mode and vice versa according to the energizing mode switching signal, and a second synthesizing circuit for detecting induced electromotive voltages generated in the driving coils as the rotor rotates in non-energizing section of the first energizing mode and synthesizing a speed signal based on the induced electromotive voltages.

As set forth above, the brushless motor speed detecting apparatus according to the present invention is adapted for synthesizing the output signals of the three position detectors for obtaining the three-phase output signals in according with the rotation by means of the first synthesizing circuit, forming the energizing mode switching signal based on the output signal of the first synthesizing circuit by means of the mode switching circuit, and energizing the driving coils by switching, according to the output signal of the mode switching circuit, the first mode in which, for example, the energizing current waveform toward the driving circuit becomes the square waveform to the second energizing mode in which, for example, the energizing current waveform toward the driving circuit becomes the waveform whose inflection point is blunted. On the other hand, the brushless motor speed detecting apparatus according to the present invention is adapted for synthesizing the speed signal based on the induced electromotive voltages by means of the second synthesizing circuit for detecting the induced electromotive voltages generated in the three-phase driving coils as the rotor rotates in the non-energizing section of the first energizing mode, and detecting the induced electromotive voltages in the non-energizing section of the first energizing mode, whereby the pure electromotive voltage can be detected. Since the energizing mode outside the first energizing mode of the driving coils is made the second energizing mode in which the inflection point of the energizing current waveform toward the driving coils, moreover, it is possible to reduce the occurrence of the spike voltage generated when the driving coils are turned on and off, so that various nonconformities originating from the spike voltage can be prevented.

Particularly according to the invention, the switching of the first energizing mode to and from the second energizing mode is smoothed in an analog mode by making the energizing mode switching signal sine wave-like so as to implement the energizing mode switching, whereby the occurrence of spike noise originating from the energizing mode switching can be suppressed.

Moreover, an object of the present invention can be accomplished with relatively simple circuit arrangements in the brushless motor speed detecting apparatus.

In the brushless motor speed detecting apparatus according to the present invention, further, the delay circuit provided between the second synthesizing circuit and the mode switching means functions as what delays the rise timing of the first energizing mode and thus the second energizing mode is maintained until the electromotive voltages are detected, whereby the energy of generating the spike voltage is reduced further.

DETAILED DESCRIPTION OF THE DRAWINGS

Figure 4:
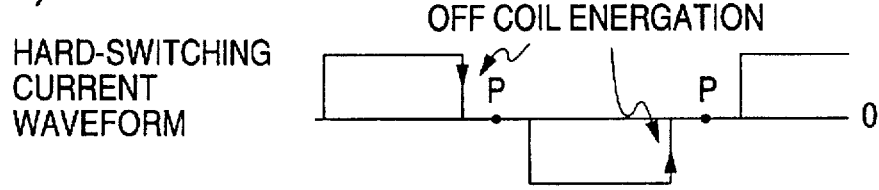
Figure 4:
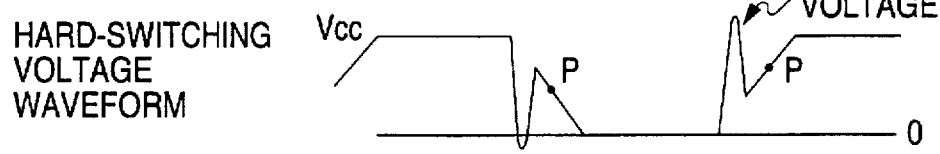
Figure 4:
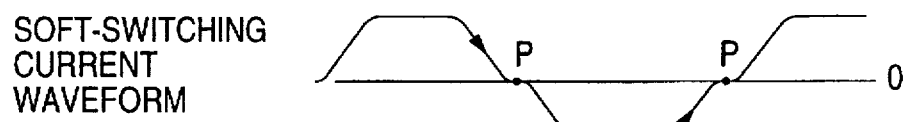
Figure 4:
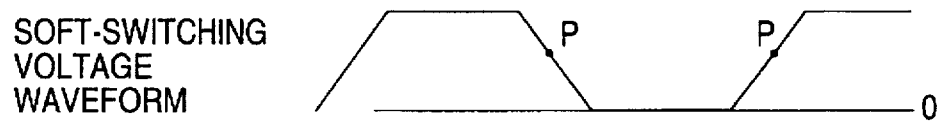
Figure 4:
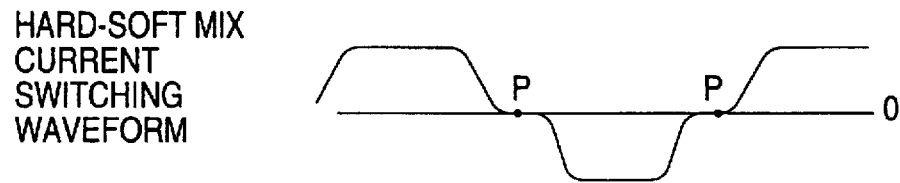
Figure 4:
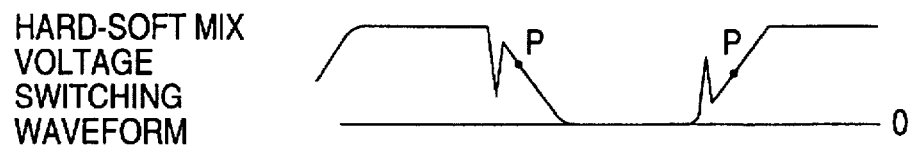
Figure 5:
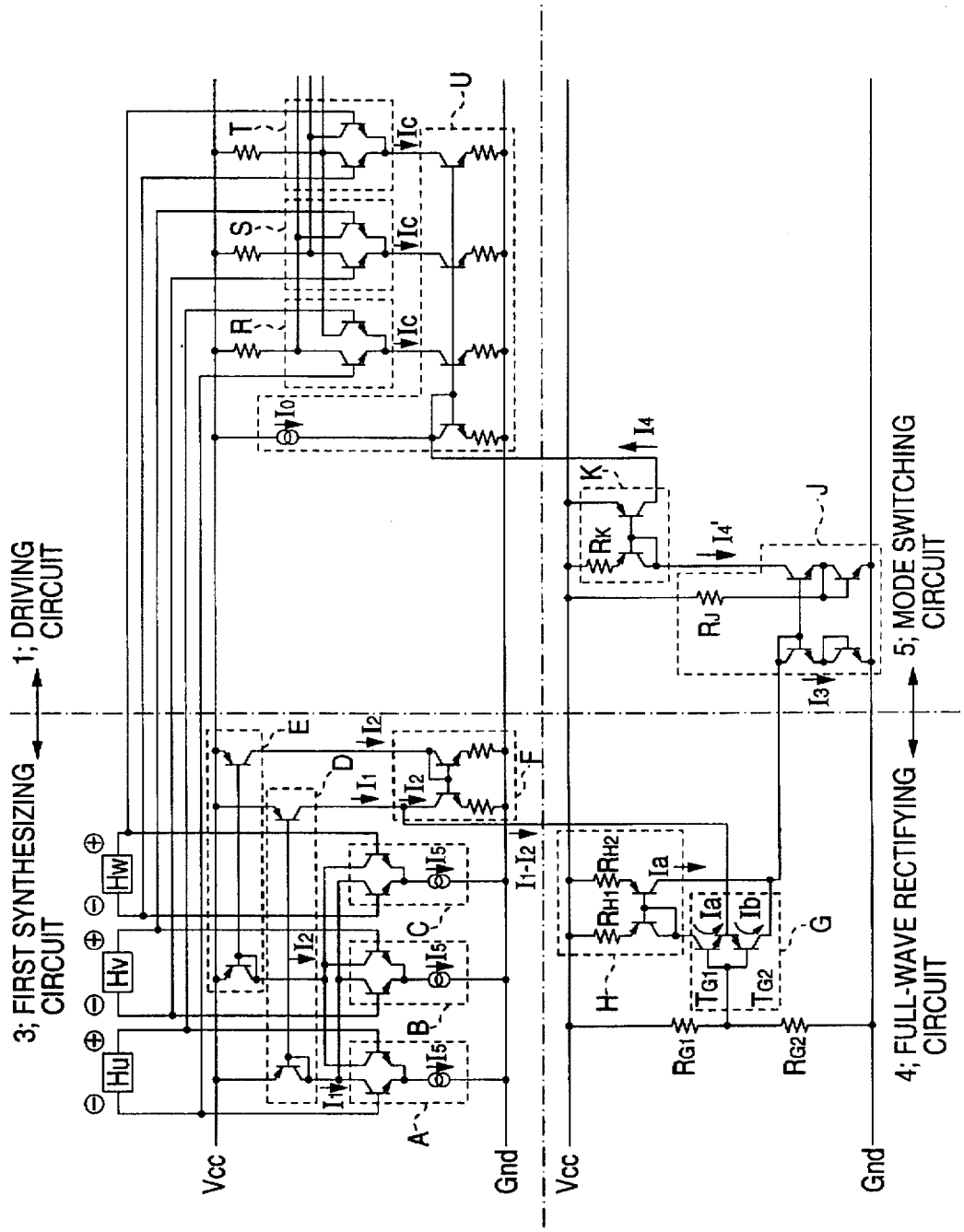
Figure 6:
Figure 6:
Figure 7:
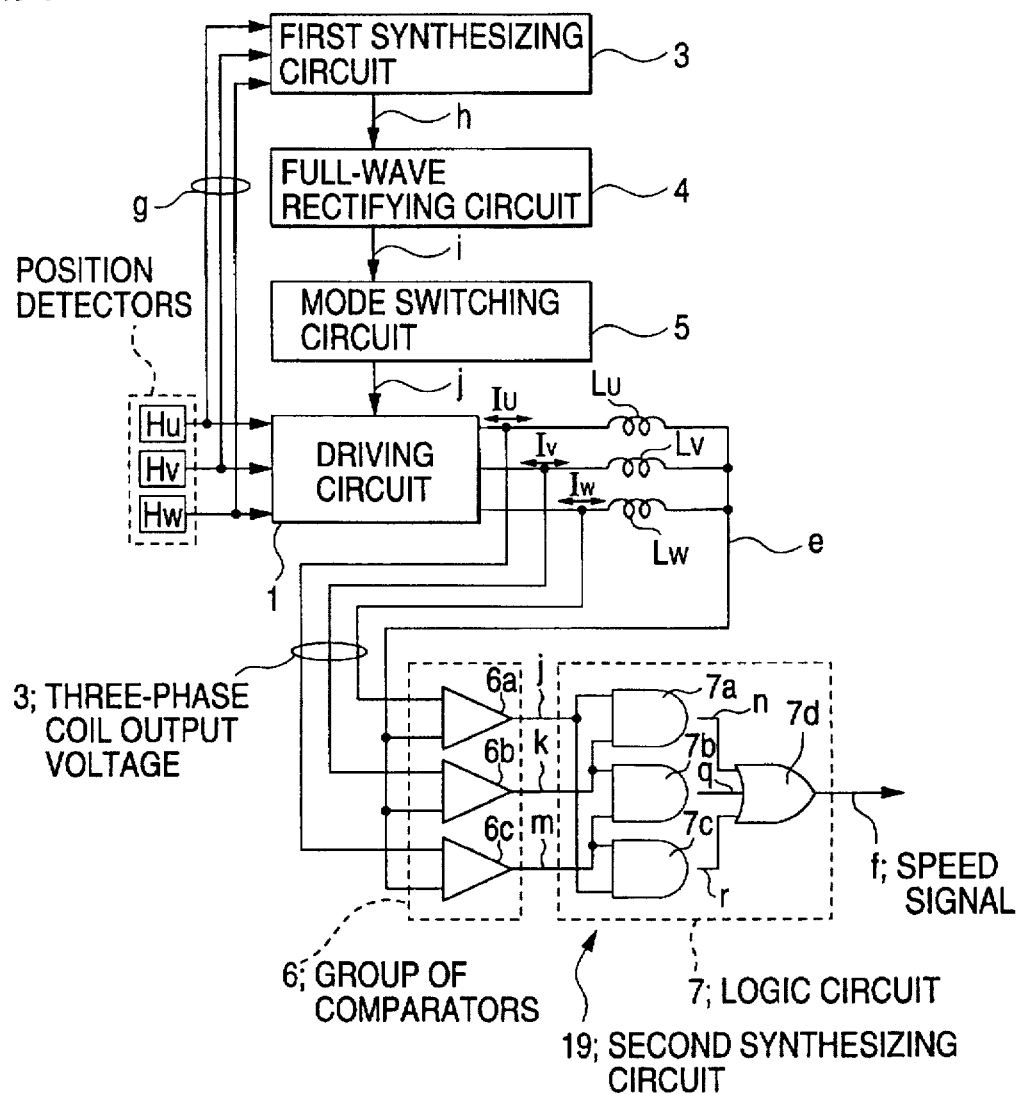
Figure 8:
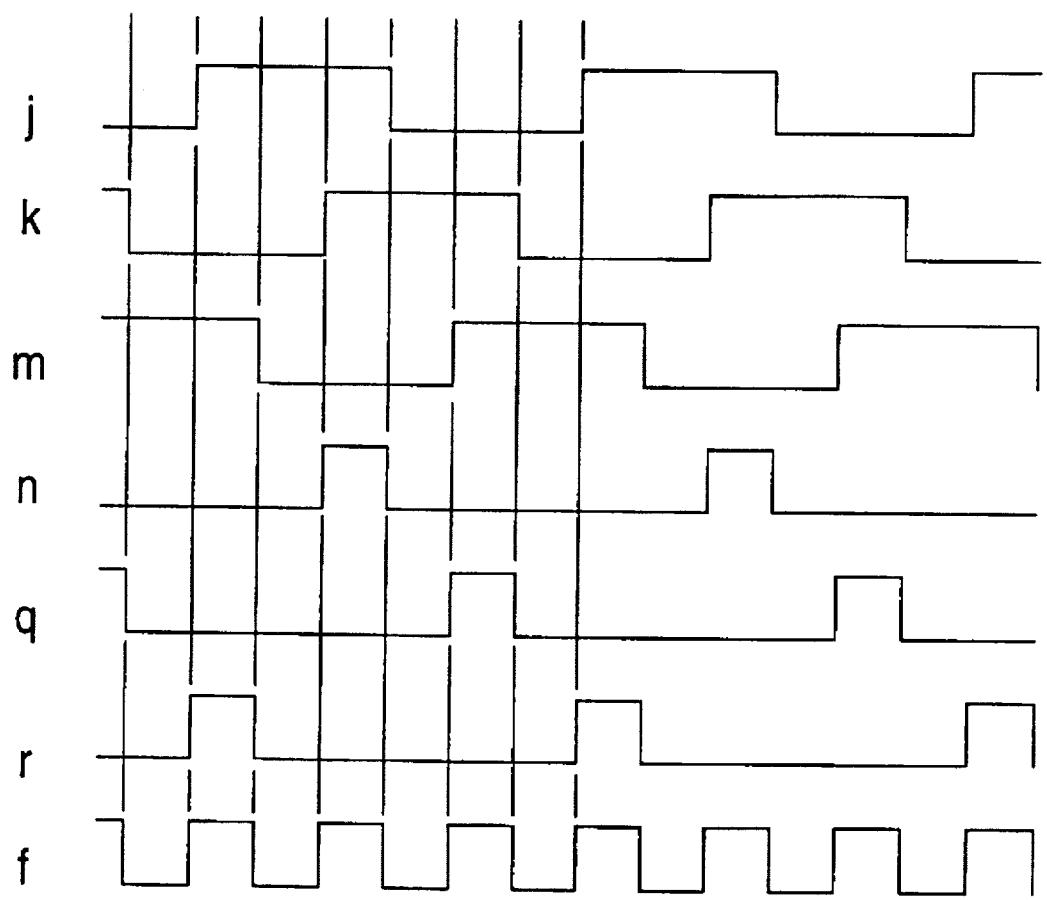
Figure 9:
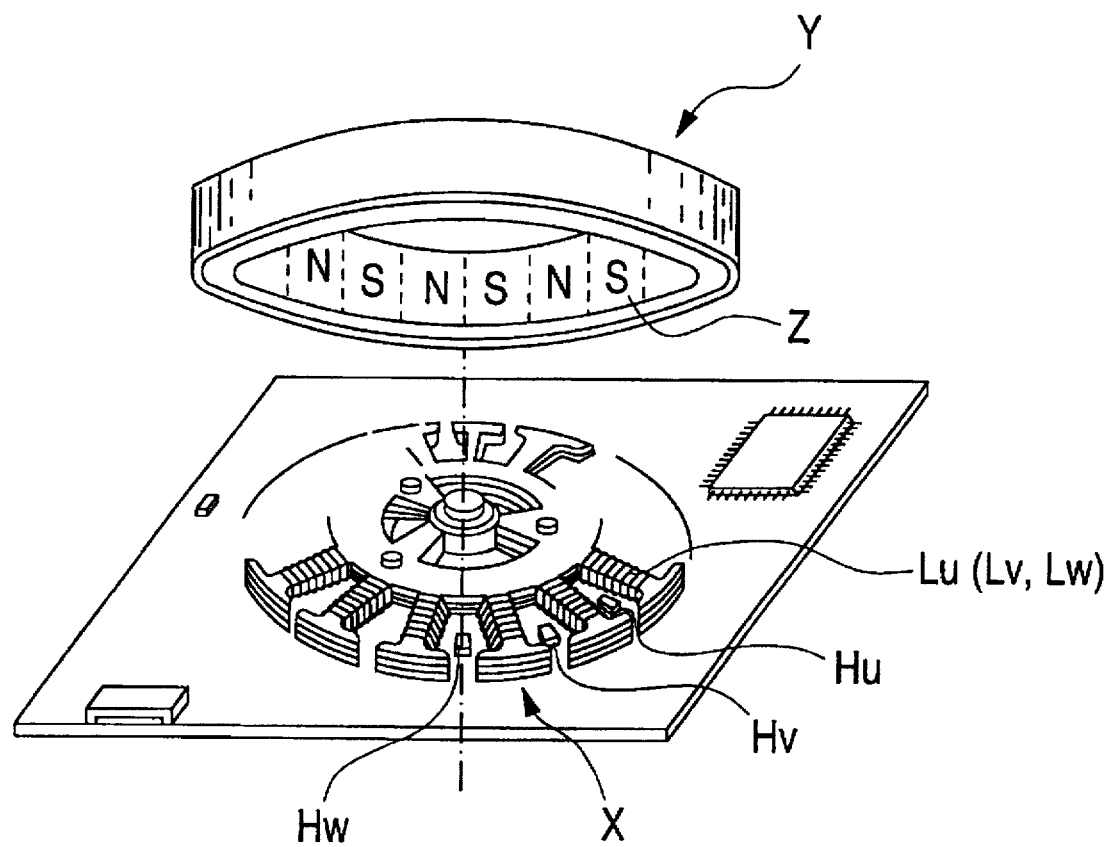
Figure 10:
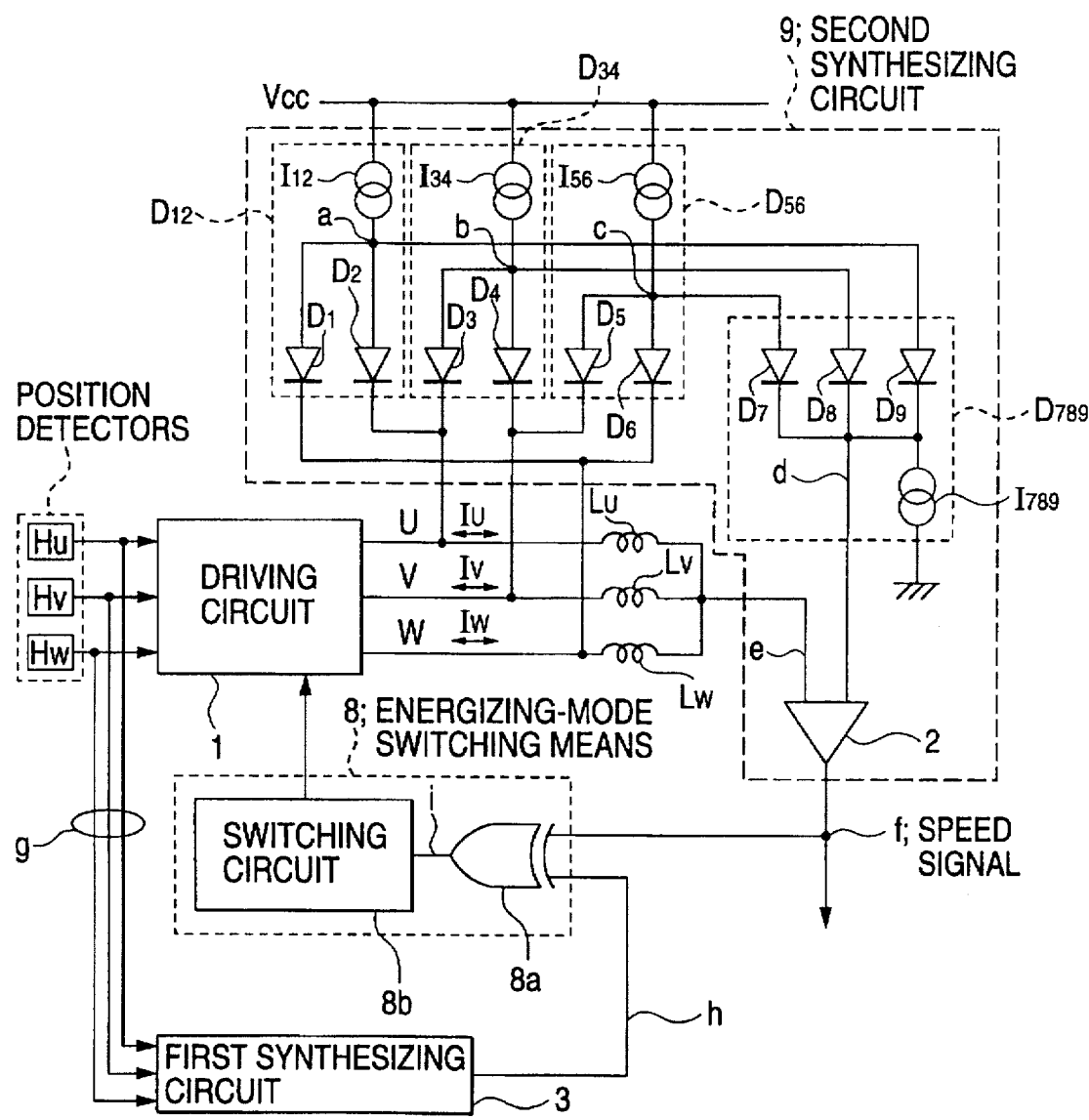
Figure 11:
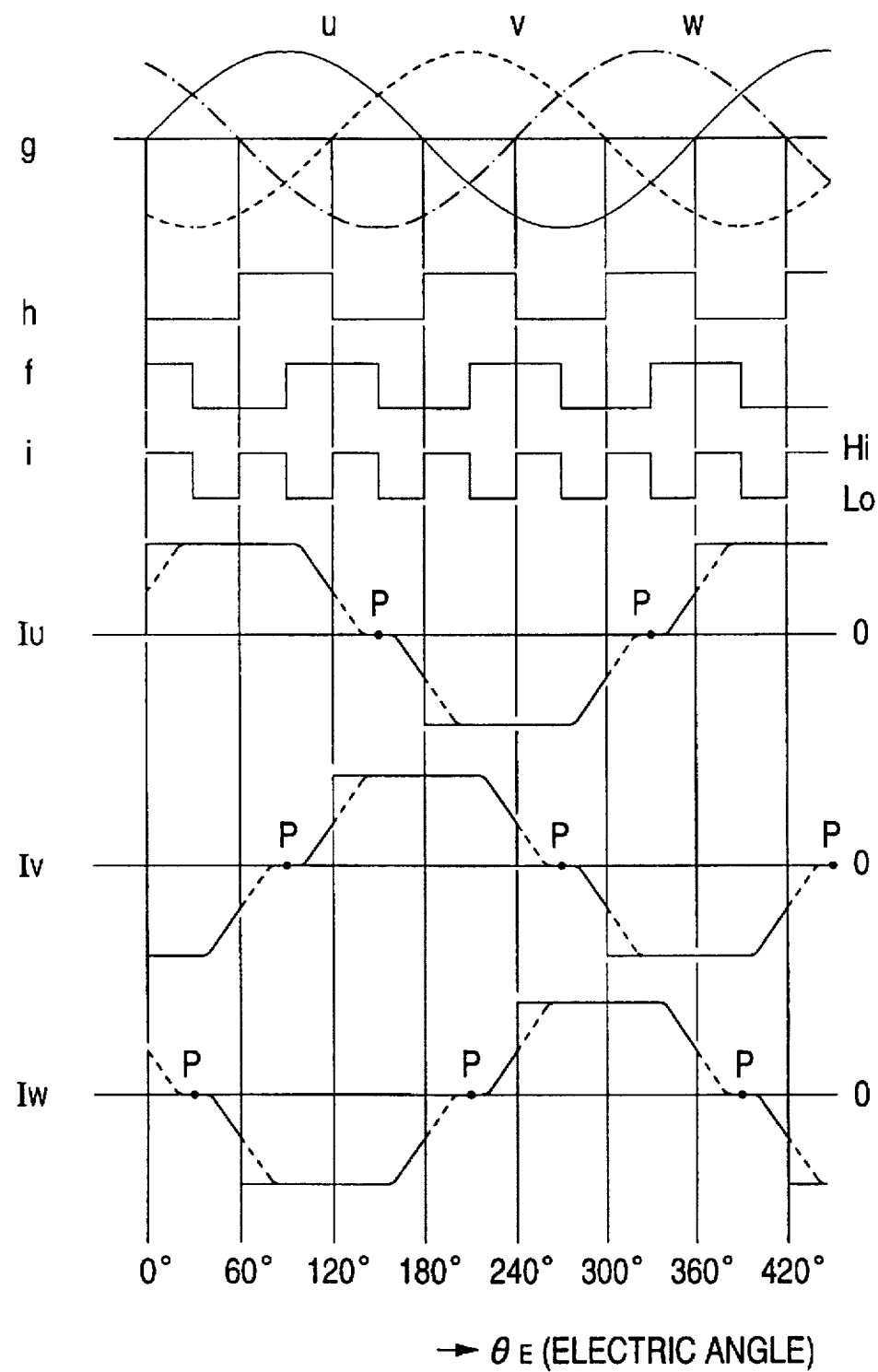
Figure 12:
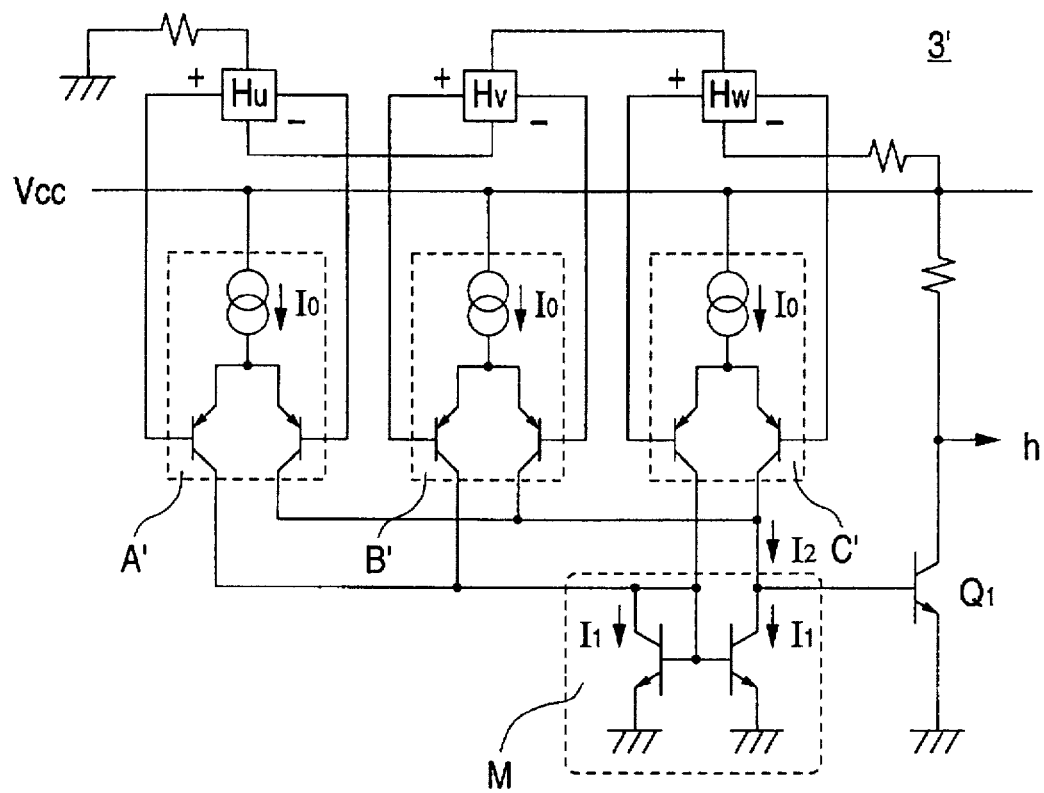
Figure 13:
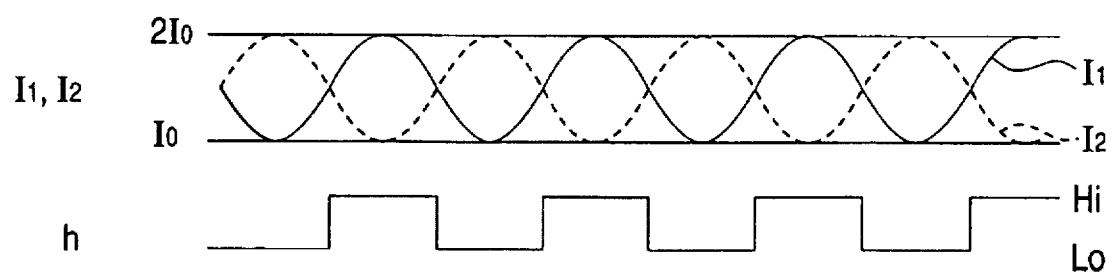
Figure 14:
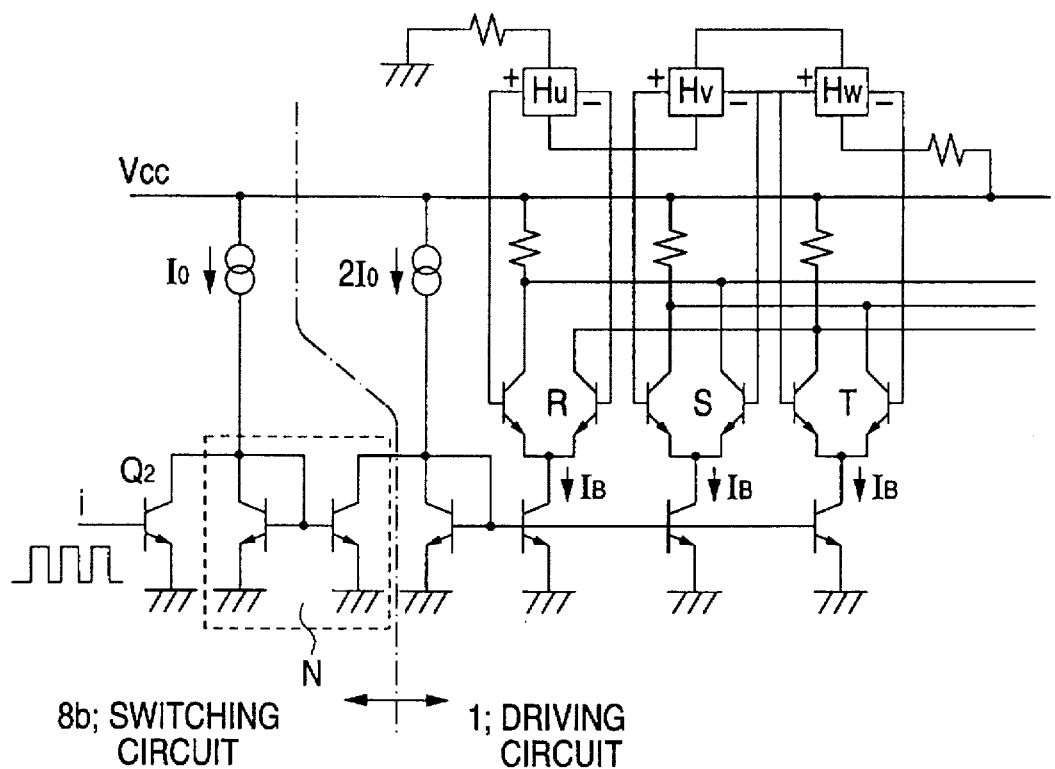
Figure 15:
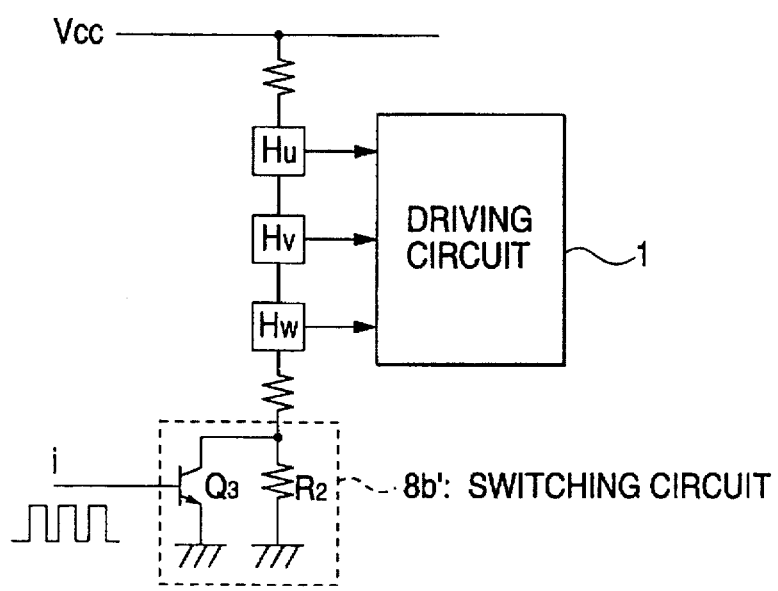
Figure 16:
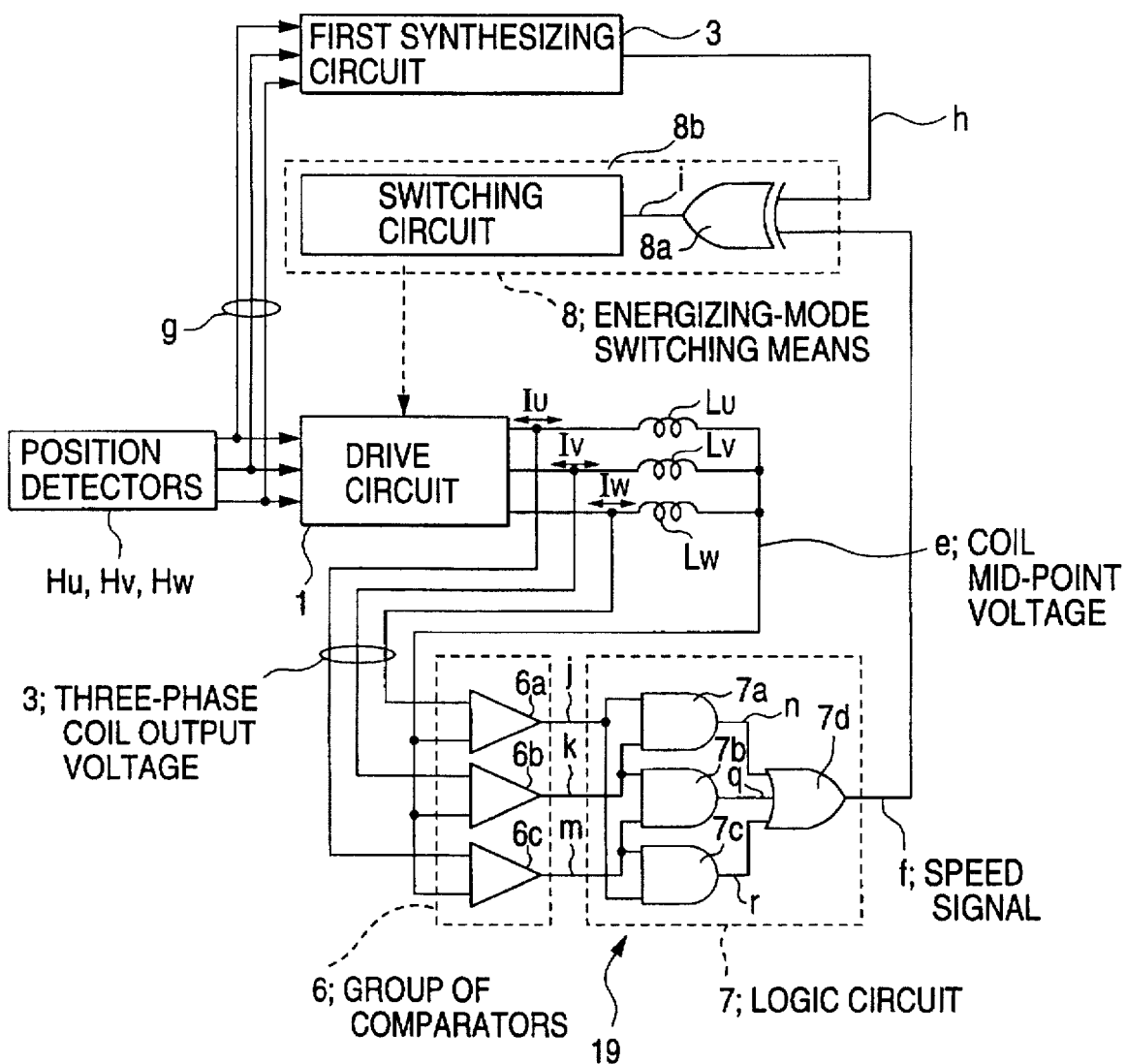
Figure 17:
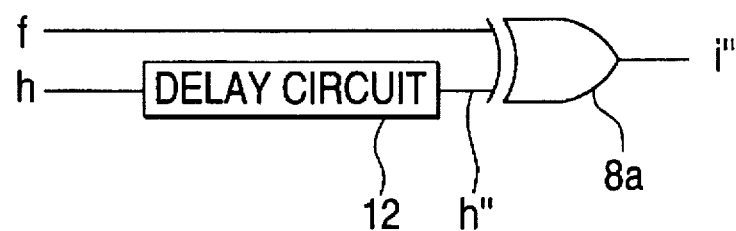
Figure 18:
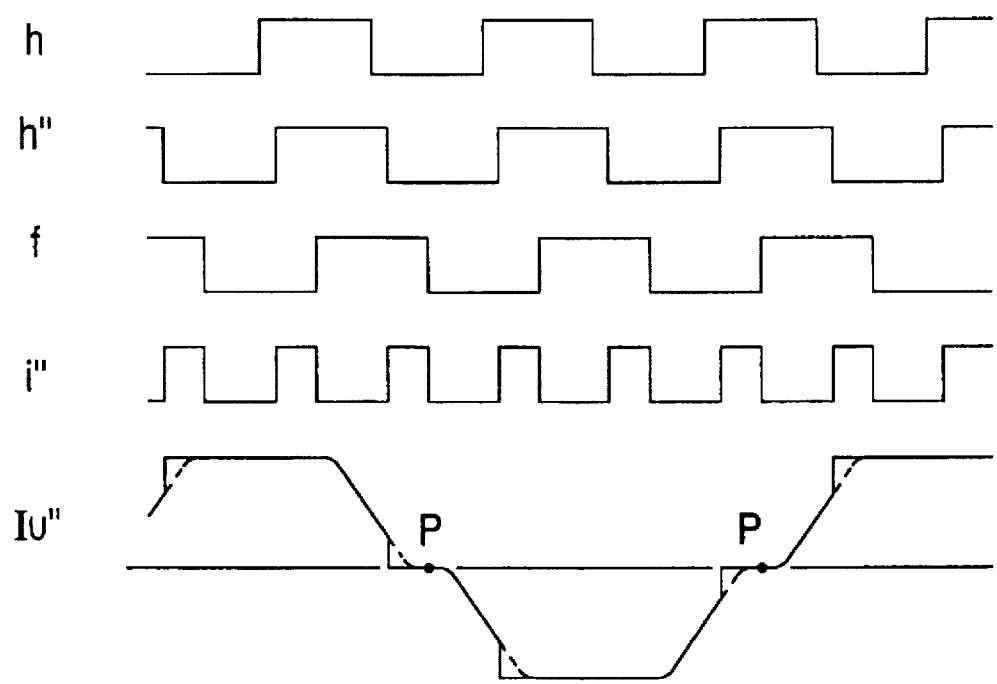
Figure 19:
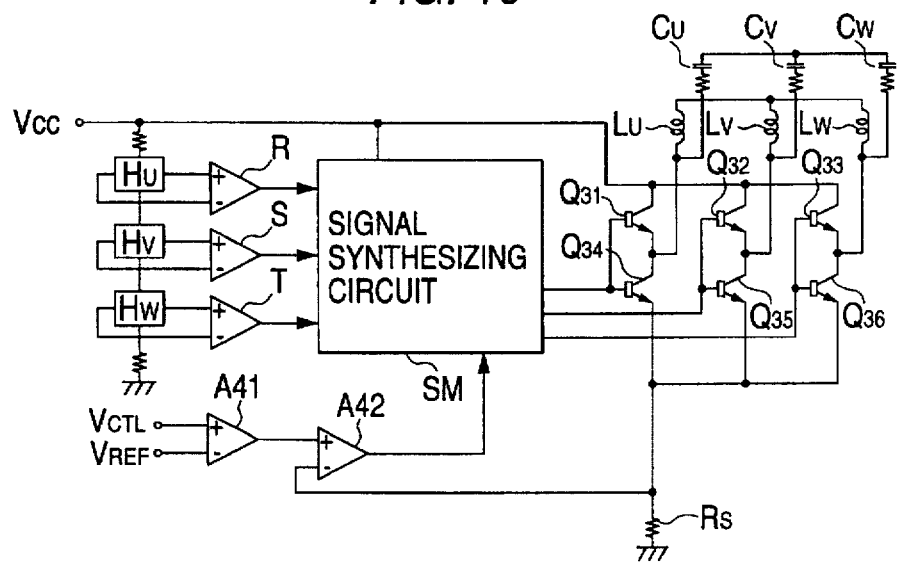
Figure 20:
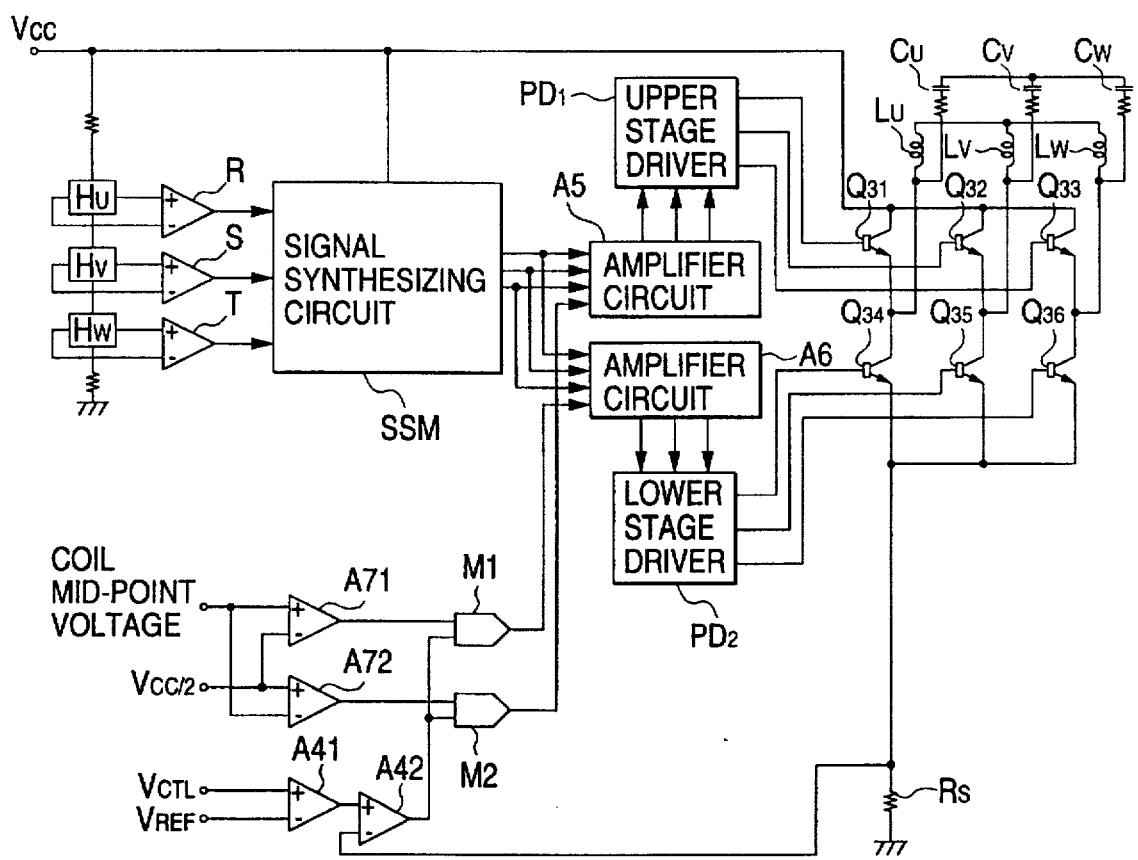

FIGS. 4 (A) to (F) are current and voltage waveform charts illustrating a driving circuit energizing state by comparing hard switching, soft switching, and switching in hard-soft mixture;

FIG. 5 is a circuit diagram illustrating a specific arrangement of the first synthesizing circuit, the full-wave rectifying circuit, the mode switching circuit and part of the driving circuit;

FIGS. 6 (a) and (b) are waveform charts illustrating undesirable examples of waveforms of signals that are output from the mode switching circuit and a square circuit;

FIG. 7 is a block diagram illustrating a brushless motor speed detecting apparatus as a second embodiment of the invention;

FIG. 8 is a timing chart illustrating the operation of a second synthesizing circuit in FIG. 7;

FIG. 9 is an explosive perspective view showing the schematic construction of a brushless motor;

FIG. 10 is a block diagram of a brushless motor speed detecting apparatus as a third embodiment of the invention;

FIG. 11 is a timing chart illustrating the operation of a first synthesizing circuit, a mode switching means and a driving circuit in FIG. 10;

FIG. 12 is a circuit diagram illustrating a specific example of the first synthesizing circuit in FIG. 10;

FIG. 13 is a timing chart illustrating the operation of circuits in FIG. 12;

FIG. 14 is a circuit diagram illustrating a specific example of the mode switching means and the driving circuit;

FIG. 15 is a circuit diagram illustrating another specific example of the mode switching means;

FIG. 16 is a block diagram illustrating a brushless motor speed detecting apparatus as still another embodiment of the invention;

FIG. 17 is a block diagram illustrating the principal part of the brushless motor speed detecting apparatus as still another embodiment of the invention;

FIG. 18 is a timing chart illustrating the circuits in FIG. 17;

FIG. 19 is a block diagram of a driving circuit of a brushless motor employing a hard-switching energizing system; and FIG. 20 is a block diagram of a driving circuit of a brushless motor employing a soft-switching energizing system.

DETAILED DESCRIPTION OF THE PREFERRED EMBODIMENT

A description will subsequently be given of embodiments of the invention by reference to the drawings.

First Embodiment

Figure 1:
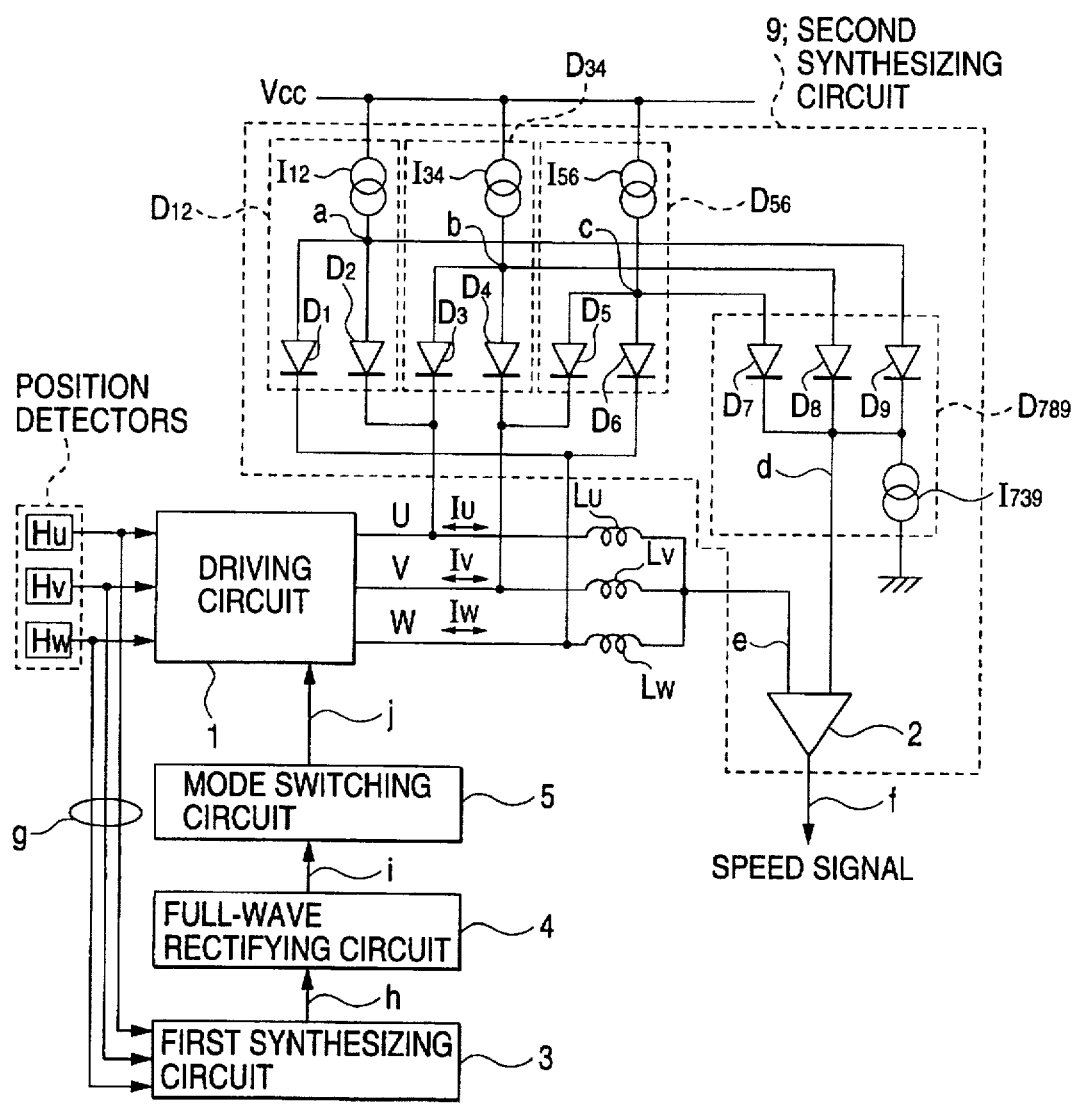
FIG. 1 is a block diagram illustrating a brushless motor speed detecting apparatus as a first embodiment of the invention.

FIG. 1 is a block diagram of a brushless motor speed detecting apparatus as a first embodiment of the present invention in the preferred form thereof. More specifically, there is shown therein an embodiment of the present invention as claimed in claim 1 and any one of claims 8 to 14. This brushless motor is, as shown in FIG. 9, provided with a stator X having three-phase driving coils Lu, Lv, Lw, a rotor Y which is placed opposite to the stator X and has magnetic poles Z, and Hall elements Hu, Hv, Hw as position detectors for obtaining three-phase sine-wave like signals corresponding to the rotation of the rotor Y. Further, driving currents Iu, Iv, Iw are fed from a driving circuit 1 into the driving coils Lu, Lv, Lw according to the output signals of the Hall elements Hu, Hv, Hw produced as the rotor Y rotates, whereby the rotor Y is rotated.

A second synthesizing circuit 9 for synthesizing speed signals is connected to the driving coils Lu, Lv, Lw. In other words, a cathode common to diodes D2, D3 is connected to the output terminal of the driving coil Lu; a cathode common to diodes D4, D5 to the output terminal of the driving coil Lv; and a cathode common to diodes D1, D6 to the output terminal of the driving coil Lw. A supply voltage VCC is connected to an anode common to the diodes D1, D2, an anode common to the diodes D3, D4 and an anode common to diodes D5, D6 via respective current sources I12, I34, I56. In this case, the diodes D1, D2 and the current source I12 constitute a two-input diode OR circuit D12; the diodes D3, D4 and the current source I34 constitute a two-input diode OR circuit D34; and the diodes D5, D6 constitute a two-input diode OR circuit D56. Further, the anodes of diodes D7, D8, D9 are connected to the anode common to these two-input diode OR circuits D12, D34, D56, respectively. Further, a grounding source is connected via a current source I789 to the cathode common to the diodes D7, D8, D9.

Further, one input terminal of a comparator 2 is connected to a coil common to the driving coils Lu, Lv, Lw, whereas the other input terminal of the comparator 2 is connected to a cathode common to a three-input diode OR circuit D789 comprising the diodes D7, D8, D9 and the current source I789. The second synthesizing circuit 9 is thus arranged. Although the coil common, that is, the neutral point, to the driving coils Lu, Lv, Lw is connected to the one input terminal of the comparator 2 according to this embodiment of the invention, moreover, resistors may be connected to the output terminals of the respective driving coils Lu, Lv, Lw, so that a virtual neutral point resulting from the star connection of these resistors is connected to the one input terminal of the comparator 2.

The Hall elements Hu, Hv, Hw as position detectors are connected to the driving circuit 1 and simultaneously connected to a first synthesizing circuit 3 for synthesizing the output signals of the Hall elements Hu, Hv, Hw. A full-wave rectifying circuit 4 for forming a full-wave rectifying signal from the first synthesizing circuit 3 is connected to the first synthesizing circuit 3. Further, a mode switching circuit 5 for forming a sine wave-like energizing-mode switching signal from the output signal of the full-wave rectifying circuit 4 is connected to the full-wave rectifying circuit 4. The driving circuit 1 is connected to the mode switching circuit 5, the driving circuit 1 being used for supplying current to the driving coils Lu, Lv, Lw by switching a hard-switching energizing mode as a first energizing mode to a soft-switching energizing mode as a second energizing mode according to the output signal of the mode switching circuit 5. A detailed description will be given of this circuit arrangement later.

Figure 2:
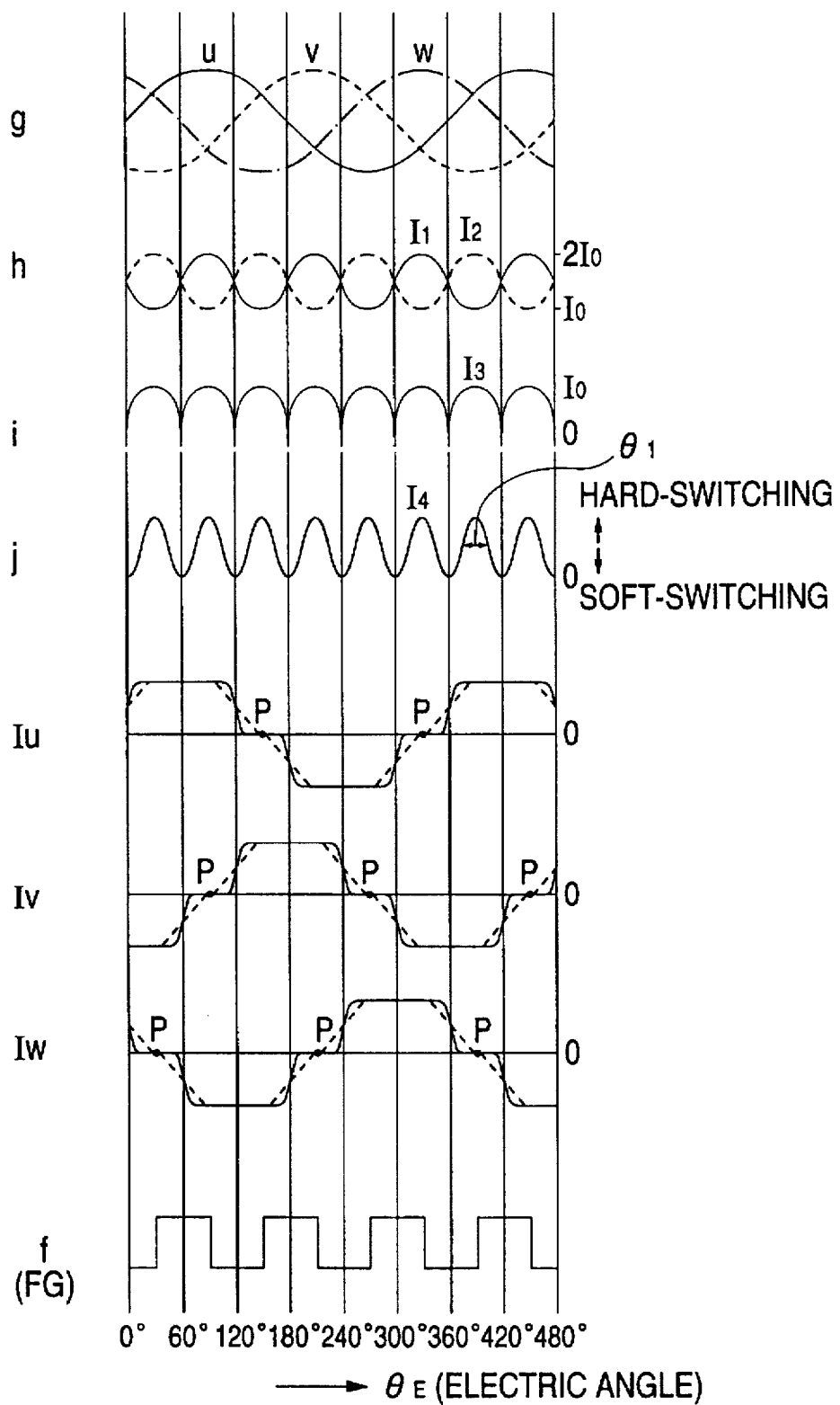
FIG. 2 is a timing chart illustrating the operation of a first synthesizing circuit, a full-wave rectifying circuit, a mode switching circuit and a driving circuit in FIG. 1.
Figure 3:
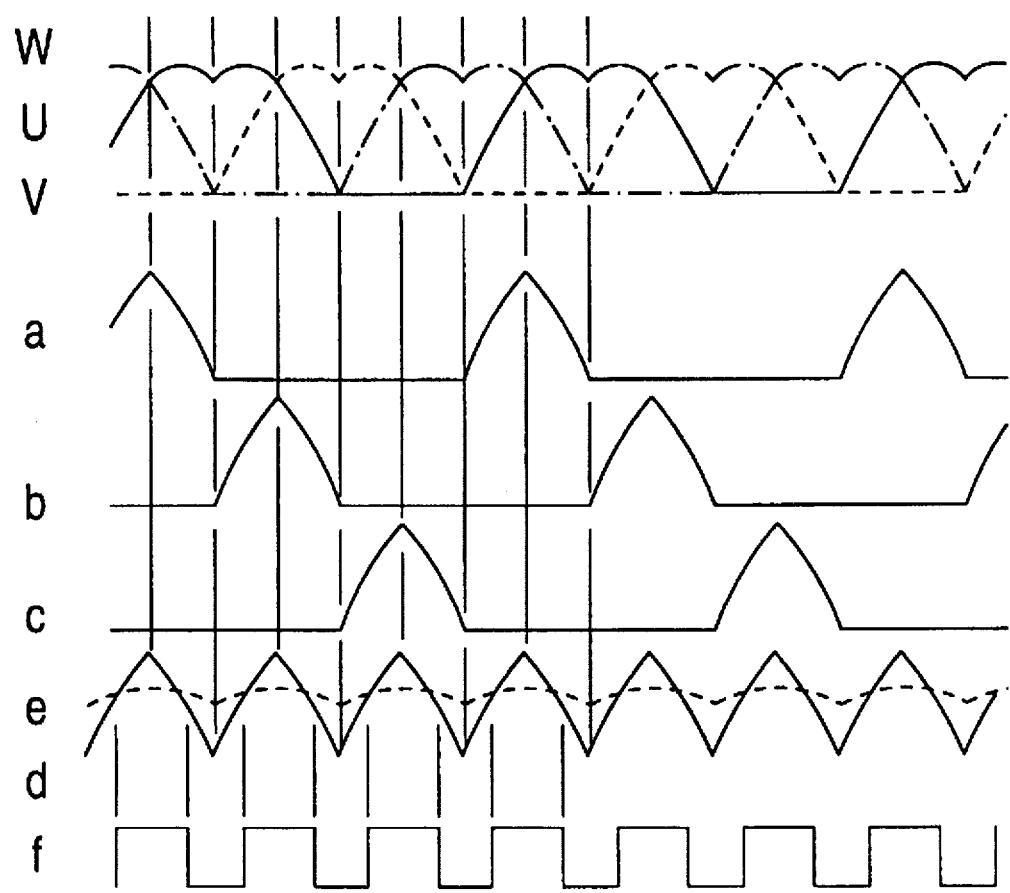
FIG. 3 is a timing chart illustrating the operation of a second synthesizing circuit in FIG. 1.

The operation of the apparatus thus constructed will subsequently be described. When the Hall elements Hu, Hv, Hw detect the rotating field of the rotor Y having the magnetic poles Z, voltage waveforms u, v, w 120° out of phase with one another as designated by g in FIG. 2 are output from the Hall elements Hu, Hv, Hw. The three-phase sine-wave like signals u, v, w are input into the driving circuit 1 and because of the driving circuit 1, the driving currents Iu, Iv, Iw are supplied to the driving coils Lu, Lv, Lw. Consequently, voltage signals designated by U (solid line), V (dotted line) and W (dashed line) in FIG. 3 are generated in the driving coils Lu, Lv, Lw. Incidentally, the voltage signal contains the induced electromotive voltage generated in each driving coil as the magnetic poles Z rotates.

The signals in U, V, W phases are input into the two-input diode OR circuits D12, D34, D56 of the second synthesizing circuit, and only the waveforms which are potentially low out of the pairs of two-input waveforms (U, V; U, V; and V, W phases) are fed from the two-input diode OR circuits D12, D34, D56 into the three-input diode OR circuit D789, respectively.

In other words, the waveform which is potentially low in U and W phases are output in a waveform shown in FIG. 3a from the two-input diode OR circuit D12; the waveform which is potentially low in the U and V phases are output in a waveform shown in FIG. 3b from the two-input diode OR circuit D34; and the waveform which is potentially low in V and W phases are output in a waveform shown in FIG. 3c from the two-input diode OR circuit D56.

The three-phase signals from these two-input diode OR circuits D12, D34, D56 are input into the three-input diode OR circuit D789. Only a waveform which is potentially highest out of the three input waveforms designated by a, b, c in FIG. 3 is output from the three-input diode OR circuit D789. In other words, a triangular wave signal of d in FIG. 3 is applied to the one input terminal of the comparator 2 from the three-input diode OR circuit D789.

The triangular wave signal d from the three-input diode OR circuit D789 and the coil mid-point voltage designated by e in FIG. 3 are each input into the comparator 2 and compared in the comparator 2. Then a speed signal designated by f in FIG. 3 (FG signal; what is designated by f in FIG. 2 is also the same) is output from the comparator 2 as the output portion of the second synthesizing circuit 9.

On the other hand, the aforesaid sine-wave like signals u, v, w designated by g in FIG. 3 are also input into the first synthesizing circuit 3 and synthesized in the first synthesizing circuit 3. FIG. 5 illustrates in detail the first synthesizing circuit 3 together with the full-wave rectifying circuit 4, the mode switching circuit 5 and part of the driving circuit 1 which are connected to the first synthesizing circuit 3.

As shown in FIG. 5, the first synthesizing circuit 3 is provided with a differential amplifier A connected to the output terminal of the Hall element Hu, a differential amplifier B connected to the output terminal of the Hall element Hv, a differential amplifier C connected to the output terminal of the Hall element Hw, current mirror circuits D, E each of which has a pair of pnp transistors connected between the co-polarized output terminals of the differential amplifiers A, B, C and the supply voltage VCC, and a current mirror circuit F having a pair of npn transistors connected between one-side collectors of the current mirror circuits D, E and the grounding source. A current I1 is output from the current mirror circuit D and a current I2 from the current mirror circuit F. Further, a signal (I1–I2) is fed from the connection between the current mirror circuits D, F into the full-wave rectifying circuit 4 in the following stage.

More specifically, the output signals of the Hall elements Hu, Hv, Hw are received by the differential amplifier A, B, C in the first synthesizing circuit 3, and the output currents of the differential amplifiers A, B, C are caused to flow together on a co-polarized basis, respectively. Then the currents I1, I2 (waveforms designated by h in FIG. 2) are made to flow into the current mirror circuit F via the current mirror circuits D, E, whereby the difference between the currents I1, I2 (I1–I2) is fed into the full-wave rectifying circuit 4 in the following stage.

As shown in FIG. 5, the full-wave rectifying circuit 4 is provided with a push-pull circuit G having an npn transistor TG1 and a pnp transistor TG2, a current mirror circuit H having a pair of pnp transistors with resistors RH1, RH2 connected to the supply voltage VCC and each connected to the pnp transistors, and a resistance voltage divider circuit having a resistor RG1 (a third resistor) and a resistor RG2 (a fourth resistor) which are connected in series between the supply voltage VCC and the grounding source. The emitter of the transistor TG1 is connected to the emitter of the transistor TG2, and the connection therebetween is connected to the connection between the current mirror circuits D, F. The bases of the transistors TG1, TG2 are commonly connected to the connection between the third and fourth resistors RG1, RG2. The collector of the transistor TG1 is connected to the one collector and common base of the current mirror circuit H, whereas the collector of the transistor TG2 is connected to the other collector of the current mirror circuit H. Further, a signal I3 is fed from the connection between the other collector of the current mirror circuit H and the collector of the transistor TG2 into the mode switching circuit 5 in the following stage.

More specifically, the pnp transistor TG2 of the push-pull circuit G in the full-wave rectifying circuit 4 is turned on when I1>I2, so that a current Ib flowing into the push-pull circuit G is fed into the mode switching circuit 5 in the following stage. Further, the npn transistor TG1 of the push-pull circuit G is turned on when I1<I2, so that a current Ia is supplied to the current mirror circuit F. The current Ia is also fed via the current mirror circuit H into the mode switching circuit 5 in the following stage. The above phenomena are alternately repeated and the so-called full-wave rectifying waveform I3 designated by i in FIG. 2 is fed from the full-wave rectifying circuit 4 to the mode switching circuit 5.

As shown in FIG. 5, the mode switching circuit 5 is provided with a square circuit J connected to the connection between the other collector of the current mirror circuit H and the collector of the transistor TG2, and a current mirror circuit K connected to the square circuit J. The square circuit J is a well known circuit having a group of npn transistors and provided with a first resistor RJ connected between the group of transistors and the supply voltage VCC. The current mirror circuit K is provided with a pair of pnp transistors and a second resistor RK connected between the emitter of the one pnp transistor and the supply voltage VCC. Then a signal I4 is fed from the other collector of the current mirror circuit K into the driving circuit 1 in the following stage.

In other words, the tip of the concave waveform where the current value becomes 0 is smoothly reshaped by squaring the current I3 (Ib when I1>I2 and Ia when I1<I2, and a waveform i shown in FIG. 2) supplied to the square circuit J in the mode switching circuit 5 and compressing the width θ1 in the direction of the electrical angle of the convex portion so as to reshape the waveform (see FIG. 2(j)), so that a signal I4' is output.

Since the first resistor RJ functions as what varies the amplitude of the output signal I4' of the square circuit J and the waveform width in the direction of the electrical angle, the resistance value of the first resistor RJ needs setting so as to provide an optimum waveform. As I4' is inversely proportional to the current flowing through the resistor RJ, the current flowing through the first resistor RJ will become too large and have a waveform as shown in FIG. 6(a) if the resistance value of the first resistor RJ is reduced too much, whereas the current flowing through the first resistor RJ will become too small and have a waveform as shown in FIG. 6(b) if the resistance value of the first resistor RJ is increased too much; therefore, a proper resistance value has to be set. In this case, the same operation may be performable even though the first resistor RJ is replaced with the current source.

Further, the amplitude of the current I4' supplied to the current mirror circuit K is varied in accordance with the resistance value of the second resistor RK in the current mirror circuit K of the mode switching circuit 5 so as to feed the current I4 in a sine-wave like form (waveform j of FIG. 2) into the driving circuit 1. Therefore, the resistance value of the second resistor RK has to be set properly as in the case of the first resistor RJ. In other words, the optimum waveform (waveform j of FIG. 2) in a sine-wave like form is made obtainable by regulating the resistors RJ, RK. The current I4 is converted into a mode switching signal.

As shown in FIG. 5, the driving circuit 1 is provided with a Hall amplifier R connected to the output terminal of the Hall element Hu, a Hall amplifier S connected to the output terminal of the Hall element Hv, a Hall amplifier T connected to the output terminal of the Hall element Hw, and a current mirror circuit U. The current mirror circuit U is connected between the Hall amplifiers R, S, T and the grounding source and provided with a current source I0 between itself and the voltage source VCC. Further, the common base is connected to the other collector of the current mirror circuit K of the mode switching circuit 5. The rest of the driving circuit 1 is similar in arrangement to the driving circuit in a soft-switching energizing system of FIG. 11.

In the driving circuit 1, the output signal I4 of the mode switching circuit 5 is input into the current mirror circuit U so that the bias currents IC of the Hall amplifiers R, S, T conform to IC=I0+I4. If the gains of the Hall amplifiers R, S, T are set higher in this case, that is, if the bias currents IC are increased, the driving circuit 1 will supply current as in the case of almost hard switching. Therefore, the bias current IC also increase when I4 increases (the convex portion of the waveform j of FIG. 2) and the hard-switching energizing mode as the first energizing mode is established, whereas when I4 decreased (the concave portion of the waveform j of FIG. 2), the original soft-switching energizing mode (the second energizing mode) is established with continuously applying the currents.

The hard-switching energizing mode is switched by the signal I4 in a sine-wave like form to the soft-switching energizing mode smoothly in an analog, not digital, mode according to this first embodiment of the invention. In other words, the currents designated by lu, lv, lw in FIG. 2 are supplied to the driving coils Lu, Lv, Lw, respectively. Incidentally, the dotted line portions of FIG. 2 indicate the waveforms solely in the soft-switching energizing mode.

In other words, the energizing waveforms lu, lv, lw toward the driving coils Lu, Lv, Lw are, as shown in FIGS. 2 and 4(E), in a mixture of the hard- and soft-switching energizing modes and at the timing P of detecting the induced electromotive voltages for the synthesis of the speed signal f, they are in the hard-switching energizing mode, whereby a pure induced electromotive voltage can be detected as a non-energizing area appears sufficiently. As a result, the speed signal f is made obtainable accurately by the second synthesizing circuit 9 after detecting the induced electromotive voltages generated in the driving coils as the rotor rotates in the non-energizing area of the first energizing mode.

At the timing of switching the energizing of the driving coils Lu, Lv, Lw (switching timing of non-energizing←→energizing), the switching can be effected substantially in the soft-switching energizing mode, so that the spike voltage level becomes reducible as shown in FIG. 4(F) as compared with the case of a conventional hard-switching system (see FIG. 4(B)).

According to the first embodiment of the invention, moreover, the mode switching signal I4 for switching the hard-switching energizing mode to and from the soft-switching energizing mode is in an analog waveform like a sine wave like form. Therefore, the switching of the hard-switching energizing mode to and from the soft-switching energizing mode can be made smoothly, whereby the occurrence of spike noise due to the energizing mode switching can be obviated.

Second Embodiment

FIG. 7 is a block diagram of a brushless motor speed detecting apparatus as a second embodiment of the present invention and FIG. 8 is a timing chart illustrating the operation of a second synthesizing circuit 19 of FIG. 7.

What makes the brushless motor speed detecting apparatus according to the second embodiment of the invention different from the first embodiment thereof is that, in place of the second synthesizing circuit 9 according to the first embodiment thereof, the second synthesizing circuit 19 having a group of comparators 6 and a logic circuit 7 is employed.

More specifically, the comparators 6a, 6b, 6c for comparing output voltages in different phases with the coil mid-point voltage are each connected to the output terminals of driving coils Lu, Lv, Lw. Further, AND gates 7a, 7b, 7c with two outputs of the comparators 6a, 6b, 6c as the respective inputs of the former are connected to the output terminals of the comparators 6a, 6b, 6c, and an OR gate 7d is connected to the output terminals of the AND gates 7a, 7b, 7c.

Thus the comparators 6a, 6b, 6c compare the output voltages in the respective phases with the coil mid-point voltage (see U, V, W, e of FIG. 3) and output square-wave signals designated by j, k, m in FIG. 8. These signals are ANDed by the AND gates 7a, 7b, 7c and signals designated by n, q, r in FIG. 8 are output from the AND gates 7a, 7b, 7c. Further, the signals are ORed by the OR gate 7d and a speed signal designated by f in FIG. 8 is output from the OR gate 7d.

The effect obtained from this embodiment of the invention is needless to say similar to what is obtainable from the first embodiment thereof because the speed signal designated by f in FIG. 7 is the same as what is designated by f in FIG. 3. Incidentally, the use of the three comparators 6a, 6b, 6c results in making the accuracy of such a speed signal slightly poorer than the speed signal in the apparatus according to the first embodiment of the invention and the use of the group of comparators and the logic circuit 7 makes the circuit slightly complicated.

Although a detailed description has been given of the embodiments of the present invention made by the present inventors, the invention is not limited to those embodiments thereof but may needless to say be modified in various ways without departing from the spirit and scope thereof. In order to accomplish the object of the present invention, still another embodiment of the present invention will subsequently be described; to put it concretely, an embodiment of the present invention as claimed in any one of claims 1 to 7 will be described. In this case, like reference characters designate like components which function similarly as those according to the preceding embodiments of the invention and the description thereof will be omitted.

Third Embodiment

FIG. 10 is a block diagram of a brushless motor speed detecting apparatus as a third embodiment of the present invention and, more specifically, there is shown therein an embodiment of the present invention as claimed in any one of claims 1 to 7.

This brushless motor is, as shown in FIG. 9, provided with the stator X having the driving coils Lu, Lv, Lw, the rotor Y which is placed opposite to the stator X and has the magnetic poles Z, and the Hall elements Hu, Hv, Hw as position detection means for obtaining three-phase sine-wave like signals corresponding to the rotation of the rotor Y. Further, the driving currents lu, lv, lw are fed from the driving circuit 1 into the driving coils Lu, Lv, Lw according to the outputs of the Hall elements Hu, Hv, Hw, whereby the rotor Y is rotated.

The second synthesizing circuit 9 is connected to the driving coils Lu, Lv, Lw, the second synthesizing circuit 9 being used for synthesizing the speed signal based on the induced electromotive voltages produced in the three-phase driving coils as the rotor X rotates. With respect to an arrangement of the second synthesizing circuit 9, the description thereof will be omitted as it has already been given in the first embodiment of the invention.

A first synthesizing circuit 3' for synthesizing the output signals of the Hall elements Hu, Hv, Hw in addition to the driving circuit 1 is connected to the Hall elements Hu, Hv, Hw as position detectors. Further, an energizing-mode switching means 8 for forming an energizing-mode switching signal according to the output signal of the first synthesizing circuit 3' and that of the second synthesizing circuit 9 is connected to the first synthesizing circuit 3' and the second synthesizing circuit 9.

In other words, one input terminal of an exclusive OR circuit 8a is connected to the first synthesizing circuit 3', whereas the other input terminal of the exclusive OR circuit 8a is connected to the comparator 2 as the output portion of the second synthesizing circuit 9. A switching circuit 8b is connected to the output terminal of the exclusive OR circuit 8a, and the output terminal of the switching means 8b is connected to the driving circuit 1.

The operation of the apparatus thus constructed will subsequently be described. When the Hall elements Hu, Hv, Hw detect the rotating field of the rotor Y having the magnetic poles Z, waveforms designated by g in FIG. 11 are output from the Hall elements Hu, Hv, Hw. The three-phase sine-wave like signals are input into the driving circuit 1 and the driving currents lu, lv, lw 120° out of phase with one another are supplied by the driving circuit 1 to the three-phase driving coils Lu, Lv, Lw. Consequently, voltage signals designated by U (solid line), V (dotted line) and W (dashed line) in FIG. 3 are generated in the driving coils Lu, Lv, Lw as the rotor Y rotates. Incidentally, these voltage signals contain the induced electromotive voltages.

The voltage signals U, V, W generated in the driving coils Lu, Lv, Lw are input into the second synthesizing circuit 9, and the speed signal designated by f in FIG. 3 is output via the two-input diode OR circuits D12, D34, D56, the three-input diode OR circuit D789 and the comparator 2 that have been described previously.

On the other hand, the aforesaid sine-wave like signals designated by g in FIG. 11 are also input into the first synthesizing circuit 3' and synthesized in the first synthesizing circuit 3'. FIG. 12 illustrates in detail the first synthesizing circuit 3' by way of example.

As shown in FIG. 12, the output signals of the Hall elements Hu, Hv, Hw are received by differential amplifiers A', B', C' in the first synthesizing circuit 3', and the output currents of the differential amplifiers A, B, C are caused to flow together on a co-polarized basis, respectively. Then currents I1, I2 are caused to flow into the current mirror M, which turns on a transistor Q1 according to the difference between the currents I1, I2.

In other words, the current flows through the base of the transistor Q1 when I2>I1 and the transistor Q1 is turned on, so that the output signal h of the first synthesizing circuit 3' becomes low in level (see FIG. 13), whereas no current flows through the base thereof when I2<I1 and the transistor Q1 is not turned on, so that the output signal h of the first synthesizing circuit 3' becomes high in level (see FIG. 13). Therefore, the signal designated by h in FIG. 2 is output.

The output signal h of the first synthesizing circuit 3' and the output signal f of the second synthesizing circuit 9 (the same signal that is designated by f in FIG. 3) are input into the exclusive OR circuit 8a, and these signals are exclusively ORed. Thus the square-wave signal designated by i in FIG. 11 is output from the exclusive OR circuit 8a.

The output signal i of the exclusive OR circuit 8a is input into the switching circuit 8b, and a mode switching signal for switching the switching energizing mode in the driving circuit 1 to the first energizing mode (hard-switching energizing mode) or the second energizing mode (soft-switching energizing mode) is formed in the switching circuit 8b. The switching energizing mode in the driving circuit 1 is set to the first energizing mode when the signal designated by i in FIG. 11 is high in level and to the second energizing mode when it is low in level. FIG. 14 illustrates in detail the switching circuit 8b and part of the driving circuit 1 by way of example.

The driving circuit 1 is provided with the Hall amplifiers R, S, T, which are connected to a signal synthesizing circuit SSM shown in FIG. 20 so as to constitute a driving circuit for effecting soft switching energizing. Even in the case of the driving circuit for effecting the soft switching energizing, it also implements energizing close to hard switching when the Hall amplifier gain is set high.

In other words, a transistor Q2 is turned off when the output signal i of the exclusive OR circuit 8a is low in level and a current mirror N draws current equivalent to the current I0 (half 2I0) out of a current 2I0. At this time, the bias currents I8 of the Hall amplifiers R, S, T becomes equal to the current I0, so that the soft-switching energizing mode is established. On the other hand, the transistor Q2 is turned on when the signal i of the exclusive OR circuit 8a is high in level and the current I0 totally flows into the transistor Q2. Then the current 2I0 is set free from being drawn by the current mirror N and the bias currents I8 of the Hall amplifiers R, S, T are increased doubly to the current 2I0.

This means the Hall amplifier gain has been doubled and energizing waveforms toward the driving coils Lu, Lv, Lw become close to the hard-switching energizing waveforms. In other words, the first energizing mode is switched to and from the second energizing mode according to the signal i from the exclusive OR circuit 8a and when the signal designated by i in FIG. 11 is high, the first energizing mode is established, whereas when it is low, the second energizing mode is established. In accordance with the operation, the currents designated by lu, lv, lw in FIG. 11 are supplied to the respective driving coils Lu, Lv, Lw. The dotted line portions designated by lu, lv, lw in FIG. 11 and by lu" in FIG. 18 refer to only the soft-switching energizing case.

More specifically, the first and second energizing modes become mixed in the energizing waveforms lu, lv, lw toward the three-phase driving coils Lu, Lv, Lw and moreover the first energizing mode is established before the timing P of detecting the induced electromotive voltages generated in the driving coils Lu, Lv, Lw. Further, the induced electromotive voltages are detected in the non-energizing section of the first energizing mode and the first energizing mode is switched to the second energizing mode after the detection is made.

Since it has been arranged that the first energizing mode is switched to and from the second energizing mode at the timing above, the speed of turning off the driving coils Lu, Lv, Lw is, as designated by Iu, Iv, Iw (solid lines) in FIG. 11, slow in the beginning and fast in the latter half. The turning-off speed is increased in the vicinity of a position where the coil current is slowly and substantially halved. As the size of the spike-like voltage is proportional to the turning-off speed and the size of the current caused to flow through the driving coils Lu, Lv, Lw immediately before they are turned off, the energy of having the spike-like voltage generated is smaller than that in the conventional hard-switching energizing system. In other words, the size of the spike-like voltage is kept smaller as shown in FIG.

4(F) than that in the conventional hard-switching energizing system (see FIG. 4(B)).

According to the third embodiment of the invention, the output signals of the Hall elements Hu, Hv, Hw are synthesized by the first synthesizing circuit 3' and then the energizing mode switching means 8 is used to form the energizing mode switching signal according to the output signal h of the first synthesizing circuit 3' and the output signal f of the second synthesizing circuit 9. Further, the driving circuit 1 switches the mode of energizing the driving coils Lu, Lv, Lw from the first energizing mode to the second energizing mode and vice versa according to the energizing mode switching signal. Moreover, the second synthesizing circuit 9 switches the energizing mode to the first energizing mode before the timing P of detecting the induced electromotive voltages generated in the driving coils Lu, Lv, Lw and the induced electromotive voltages are detected in the non-energizing section of the first energizing mode, which is switched to the second energizing mode after the detection is made. Moreover, the pure induced electromotive voltage can be detected in the hard switching state at the timing P of detecting the induced electromotive voltages, and the spike-like voltage is restrained from being generated while the soft switching state is maintained until the switching operation proceeds to a certain extent at the timing of switching the energizing of the driving coils. While various nonconformities such as motor noise originating from the spike-like voltage, through current, current interruption and oscillation due to parasitic transistors of driving ICs are prevented, a speed signal is thus made obtainable with accuracy.

Although the energizing mode switching signal has been formed according to the output signal h of the first synthesizing circuit 3' and the output signal f of the second synthesizing circuit 9 according to the third embodiment of the invention by way of example, it may be formed using a signal other than the output signal f of the second synthesizing circuit 9. In other words, a signal h' lagging by a phase angle of 30° in terms of an electrical angle is formed from the first synthesizing circuit 3' instead of the output signal h of the first synthesizing circuit 3' and then the signals h', h are input to the exclusive OR circuit 8a so that a signal designated by i in FIG. 11 may be formed; accordingly, it is possible to form the energizing mode switching signal thereby as in the third embodiment of the invention.

Fourth Embodiment

FIG. 15 is a circuit diagram according to a fourth embodiment of the invention illustrating a specific arrangement of a switching circuit in the energizing mode switching means 8. A switching circuit 8b' according to the fourth embodiment of the invention is arranged so that a Hall bias is switched over according to the signal i from the exclusive OR circuit 8a and by increasing the outputs of the Hall elements Hu, Hv, Hw instead of raising the gains of the Hall amplifiers, the first energizing mode is made obtainable.

More specifically, a transistor Q3 is turned off when the output signal i of the exclusive OR circuit 8a is low and the outputs of the Hall elements Hu, Hv, Hw is decreased by a resistor R8, whereby the soft-switching energizing mede (the second energizing mode) as the originally intended energizing mode of the driving circuit 1 is obtainable. When the output signal i of the exclusive OR circuit 8a is high conversely, the transistor Q3 is turned on and the outputs of the Hall elements Hu, Hv, Hw are set greater, whereby the hard-switching energizing mode (the first energizing mode) is obtainable. Even though the switching circuit 8b' is arranged like this, the same effect that has been obtained according to the third embodiment of the invention as described earlier may needless to say be achievable.

Fifth Embodiment

FIG. 16 is a block diagram of a brushless motor speed detecting apparatus as another embodiment (Embodiment 5) of the present invention as claimed in claim 2. A timing chart illustrating the operation of the second synthesizing circuit 19 in FIG. 16 is similar to what is shown in FIG. 8.

What makes this fifth embodiment of the invention different from those described previously is to employ the second synthesizing circuit 19 including the group of comparators 6 and the logic circuit 7 in place of the second synthesizing circuit 9 including the two-input diode OR circuits and the three-input diode OR circuit.

More specifically, the comparators 6a, 6b, 6c for comparing output voltages in different phases with the coil mid-point voltage are each connected to the output terminals of driving coils Lu, Lv, Lw. Further, the AND gates 7a, 7b, 7c with two outputs of the comparators 6a, 6b, 6c as the respective inputs of the former are connected to the output terminals of the comparators 6a, 6b, 6c, and the OR gate 7d is connected to the output terminals of the AND gates 7a, 7b, 7c.

Thus the comparators 6a, 6b, 6c compare the output voltages in the respective phases with the coil mid-point voltage, and output the square-wave signals designated by j, k, m in FIG. 8. These signals are ANDed by the AND gates 7a, 7b, 7c and the signals designated by n, q, r in FIG. 8 are output from the AND gates 7a, 7b, 7c. Further, the signals are ORed by the OR gate 7d and the speed signal designated by f in FIG. 8 is output from the OR gate 7d.

The effect obtained from this embodiment of the invention is needless to say similar to what is obtainable from the aforementioned embodiment thereof because the speed signal designated by f in FIG. 8 is the same as what is designated by f in FIG. 3.

Sixth Embodiment

FIG. 17 is a block diagram illustrating the principal part of a brushless motor speed detecting apparatus as still another embodiment as a sixth embodiment of the invention. FIG. 18 shows a timing chart illustrating the operation of the circuit of FIG. 17; to be concrete, the chart is related to the invention as claimed in claim 7. What makes this brushless motor speed detecting apparatus according to the sixth embodiment of the invention different from the above embodiment thereof is that a delay circuit 12 for delaying the rise timing of the output signal of the first synthesizing circuit 3' is provided between the first synthesizing circuit 3' and the mode switching means 8 (more precisely, between the first synthesizing circuit 3' and the exclusive OR circuit 8a).

More specifically, a signal designated by h" in FIG. 18 as the delayed output signal of the first synthesizing circuit 3' is output from the delay circuit 12 and this signal h" is exclusively ORed with the speed signal f in the exclusive OR circuit 8a. Further, a signal designated by i" in FIG. 18 as the signal whose rise timing has been delayed as designated by i in FIG. 11 is output from the exclusive OR circuit 8a.

Therefore, the timing at which current waveforms Iu", Iv", Iw" (represented by Iu" in FIG. 18) flowing through the driving coils Lu, Lv, Lw are switched to the first energizing mode is slightly delayed, so that the second energizing mode is maintained until the coil currents are made smaller. Consequently, the energy of generating the spike voltage is reducible in comparison with the preceding embodiments of the invention.

Even according to the invention as claimed in any one of claims 2 to 7, like what is claimed in any one of claims 7 to 14, the first energizing mode is conversely established at the timing of detecting the induced electromotive voltages generated in the driving coils Lu, Lv, Lw and the pure induced electromotive voltage is detected in the non-energizing section. Further, the second energizing mode is maintained until switching proceeds to a certain extent at the timing of switching the energizing of the driving coils Lu, Lv, Lw so as to reduce the generation of the spike voltage. Consequently, the speed signal is obtainable with accuracy while various nonconformities originating from the spike voltage are prevented from occurring.

Although the opposed periphery type brushless motor with the core as shown in FIG. 9 has been taken up by way of example according to each embodiment of the invention as set forth above, the present invention is not limited to the aforesaid embodiments thereof but may needless to say be applicable to any coreless brushless motor or opposed face type brushless motor. Although a description has been given using Hall elements as position detectors according to each embodiment of the invention as set forth above, like effect may be achievable even though choke coils, magnetic resistance effect elements and the like in addition to Hall elements are employed.

As set forth above, the brushless motor speed detecting apparatus according to the present invention is adapted for synthesizing the output signals of the three position detectors for obtaining the three-phase output signals in according with the rotation by means of the first synthesizing circuit, forming the energizing mode switching signal based on the output signal of the first synthesizing circuit by means of the mode switching circuit, and energizing the driving coils by switching, according to the output signal of the mode switching circuit, the first mode in which, for example, the energizing current waveform toward the driving circuit becomes the square waveform to the second energizing mode in which, for example, the energizing current waveform toward the driving circuit becomes the waveform whose inflection point is blunted. On the other hand, the brushless motor speed detecting apparatus according to the present invention is adapted for synthesizing the speed signal based on the induced electromotive voltages by means of the second synthesizing circuit for detecting the induced electromotive voltages generated in the three-phase driving coils as the rotor rotates in the non-energizing section of the first energizing mode, and detecting the induced electromotive voltages in the non-energizing section of the first energizing mode, whereby the pure electromotive voltage can be detected. Since the energizing mode outside the first energizing mode of the driving coils is made the second energizing mode in which the inflection point of the energizing current waveform toward the driving coils, moreover, it is possible to reduce the occurrence of the spike voltage generated when the driving coils are turned on and off, so that various nonconformities originating from the spike voltage can be prevented.

Particularly according to the invention as claimed in any one of claims 8 to 14, the switching of the first energizing mode to and from the second energizing mode is smoothed in an analog mode by making the energizing mode switching signal sine wave-like so as to implement the energizing mode switching, whereby the occurrence of spike noise originating from the energizing mode switching can be suppressed.

Moreover, an object of the present invention can be accomplished with relatively simple circuit arrangements in the brushless motor speed detecting apparatus as claimed in any one of claims 2 to 7.

In the brushless motor speed detecting apparatus according to the present invention as claimed in claim 7, further, the delay circuit provided between the second synthesizing circuit and the mode switching means functions as what delays the rise timing of the first energizing mode and thus the second energizing mode is maintained until the electromotive voltages are detected, whereby the energy of generating the spike voltage is reduced further.

What is claimed is:

1. A brushless motor speed detecting apparatus comprising:

a stator having three-phase driving coils which are energized reciprocally in the positive and negative directions;

a rotor having magnetic poles;

three position detectors for obtaining three-phase signals corresponding to the rotation of the rotor;

a first synthesizing circuit for synthesizing output signals from the three phase signals;

mode switching means for forming an energizing mode switching signal according to the output signal of the first synthesizing circuit;

a driving circuit for supplying currents to the driving coils and during supplying currents switching an energizing mode from a first energizing mode to a second energizing mode and vice versa according to the energizing mode switching signal; and a second synthesizing circuit for detecting induced electromotive voltages generated in the driving coils as the rotor rotates in non-energizing section of the first energizing mode and synthesizing a speed signal based on the induced electromotive voltages.

2. A brushless motor speed detecting apparatus as claimed in claim 1, wherein the mode switching means form an energizing mode switching signal according to the output signals of the first and second synthesizing circuits.

3. A brushless motor speed detecting apparatus as claimed in claim 1, wherein the mode switching means form an energizing mode switching signal according to the output signal of the first synthesizing circuit and a signal 30° out of phase in terms of an electrical angle with the output signal thereof.

4. A brushless motor speed detecting apparatus as claimed in claim 1, wherein an energizing current waveform toward the driving coil is square in the first energizing mode and wherein an energizing current waveform toward the driving coil is a waveform whose inflection point is blunted in the second energizing mode.

5. A brushless motor speed detecting apparatus as claimed in claim 2, wherein the mode switching means includes an exclusive OR circuit for receiving the output signals of the first synthesizing circuit and the speed signal of the second synthesizing circuits, and a switching circuit for switching the energizing mode of the driving circuit from the first energizing mode to the second energizing mode and vise versa according to the output signal of the exclusive OR circuit.

6. A brushless motor speed detecting apparatus as claimed in claim 1, wherein the second synthesizing circuit includes two-input diode OR circuits each connected to the phase-to-phase output terminals of the driving coil, and a three-input diode OR circuit connected to the output terminals of the two-input diode OR circuits and inversely connected to the diodes of the two-input diode OR circuits.

7. A brushless motor speed detecting apparatus as claimed in claim 1, further comprising:

a delay circuit provided between the first synthesizing circuit and the mode switching means and used for delaying the rise timing of the energizing mode switching signal.

8. A brushless motor speed detecting apparatus comprising:

a stator having three-phase driving coils which are energized reciprocally in the positive and negative directions;

a rotor having magnetic poles;

three position detectors for obtaining three-phase signals corresponding to the rotation of the rotor;

a first synthesizing circuit for synthesizing an output signal from the three-phase signals;

a full-wave rectifying circuit for forming a full-wave rectifying signal from the output signal of the first synthesizing circuit;

mode switching means for forming an energizing mode switching signal in a sine-wave like form according to the full-wave rectifying signal;

a driving circuit for supplying currents to the driving coils and during supplying currents switching an energizing mode from a first energizing mode to a second energizing mode and vice versa according to the energizing mode switching signal, and a second synthesizing circuit for detecting induced electromotive voltages generated in the driving coils as the rotor rotates in the non-energizing section of the first energizing mode and synthesizing a speed signal based on the induced electromotive voltages.

9. A brushless motor speed detecting apparatus as claimed in claim 8, wherein an energizing current waveform toward the driving coil is square in the first energizing mode and wherein an energizing current waveform toward the driving coil is a waveform whose inflection point is blunted in the second energizing mode.

10. A brushless motor speed detecting apparatus as claimed in claim 8, wherein the mode switching means includes a square circuit and current mirror circuits and wherein the square circuit forms a signal in a sine-wave like form by squaring the full-wave rectifying signal, whereas the current mirror circuit receives the signal in a sine-wave like form from the square circuit and forms the energizing mode switching signal.

11. A brushless motor speed detecting apparatus as claimed in claim 10, wherein the square circuit includes a group of transistors and a first resistor connected between the group of transistors and a supply voltage, wherein the group of transistors comprises two sets of transistors including a first set and a second set, said first set and said second set each comprising first and second transistors arranged so that an emitter of the first transistor is connected to a collector and a base of the second transistor, one end of said first resistor being connected to the collector of the second transistor in said second set, and the other end of said first resistor being connected to said supply voltage.

12. A brushless motor speed detecting apparatus as claimed in claim 10, wherein the current mirror circuit includes a pair of transistors and a second resistor connected between the emitter of one of the pair of transistors and a supply voltage.

13. A brushless motor speed detecting apparatus as claimed in claim 8, wherein the second synthesizing circuit includes two-input diode OR circuits each connected to the phase-to-phase output terminals of the driving coil, and a three-input diode OR circuit connected to the output terminals of the two-input diode OR circuits and inversely connected to the diodes of the two-input diode OR circuits.

14. A brushless motor speed detecting apparatus as claimed in claim 8, wherein the full-wave rectifying circuit includes a third and a fourth resistor constituting a resistance voltage divider circuit, a push-pull circuit, and a current mirror circuit having a resistor.

* * * * *